US006748831B2

United States Patent
Eto (10) Patent No.: US 6,748,831 B2
(45) Date of Patent: Jun. 15, 2004

(54) PLIERS FOR SUCTION CUP (76) Inventor: Yasuhito Eto, c/o Kabushiki Kaisha TOPCON, 75-1, Hasunuma-cho, Itabashi-ku, Tokyo 174-0052 (JP)

( * ) Notice: Subject to any disclaimer, the term of this patent is extended or adjusted under 35 U.S.C. 154(b) by 0 days.

(21) Appl. No.: 10/229,728

(22) Filed: Aug. 28, 2002

(65) Prior Publication Data

US 2003/0041703 A1 Mar. 6, 2003

(30) Foreign Application Priority Data

Aug. 31, 2001 (JP) ........................................ 2001-262669

(51) Int. Cl.$^7$ ................................................. B25B 7/02
(52) U.S. Cl. ........................................ 81/424.5; 81/420
(58) Field of Search ........................ 81/415, 418, 419, 81/420, 421, 424.5, 426, 426.5

(56) References Cited

U.S. PATENT DOCUMENTS

| 1,085,461 | A | * | 1/1914 | Michaelis | 81/419 |
| 1,910,750 | A | * | 5/1933 | Clark | 81/426.5 |
| 1,911,429 | A | * | 5/1933 | Carroll | 81/423 |
| 2,471,372 | A | * | 5/1949 | Jankovich | 81/420 |
| 2,602,357 | A | * | 7/1952 | Nash | 29/213.1 |
| 2,977,150 | A | * | 3/1961 | Thomas | 294/118 |
| 4,559,853 | A | * | 12/1985 | Oye | 81/420 |

\* cited by examiner

Primary Examiner—Joseph J. Hail, III
Assistant Examiner—David B. Thomas
(74) Attorney, Agent, or Firm—Chapman and Cutler LLP (57) ABSTRACT

Disclosed are pliers for suction cup capable of removing easily a suction cup from an eyeglass lens. The suction cup includes a lens holding portion for holding the eyeglass lens and a mounting base formed integrally with the lens holding portion. The pliers comprise first and second pinching portions relatively movable close and apart to each other for pinching the mounting base, opposed surfaces formed on the first and second pinching portions to oppose the mounting base, and an engaged convex portion provided on at least one of the opposed surfaces of the first and second pinching portions to contact with the mounting base.

9 Claims, 7 Drawing Sheets

PLIERS FOR SUCTION CUP

BACKGROUND OF THE INVENTION

1. Field of the Invention

The present invention relates to pliers for suction cup capable of effectively removing from an eyeglass lens a suction cup for using to mount the eyeglass lens on a lens grinding apparatus which grinds the eyeglass lens.

2. Description of the Prior Art

Conventionally, there is known a lens grinding apparatus which grinds the periphery of an unprocessed circular eyeglass lens (blank lens) into a lens configuration (edge shape) of an eyeglass frame. In the lens grinding apparatus, the eyeglass lens is adapted to grind by a grinder into an edge shape of the eyeglass frame with rotation of a pair of lens rotated shafts for holding the eyeglass lens.

Figure 7:
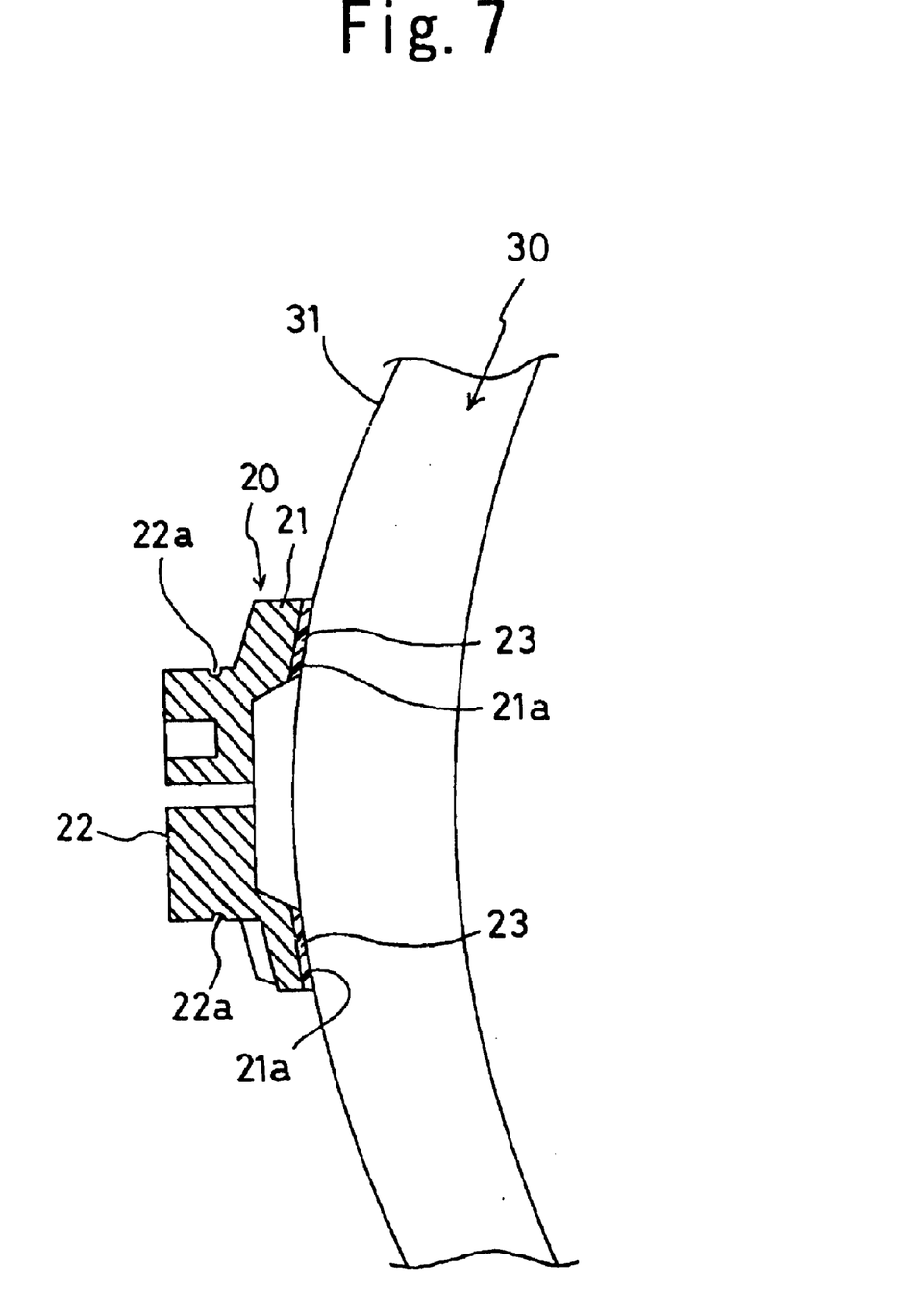
FIG. 7 is a sectional view showing a state of mounting the suction cup on the eyeglass lens.

Generally, there is used a suction cup 20 for holding an eyeglass lens 30 to lens rotated shafts (not shown) as shown in FIG. 7.

The suction cup 20 comprises a lens holding portion 21 made of a resilient member of a hard rubber and so on and a mounting base 22 formed integrally with the lens holding portion 21.

The lens holding portion 21 has an adhesive surface 21a to which a double-stick tape 23 having both adhesive surfaces is adhered. The double-stick tape 23 acts to adhere the adhesive surface 21a of the lens holding portion 21 to a curved surface 31 of the eyeglass lens 30.

The mounting base 22 is, also, formed to project in a rod-like manner from the center of the lens holding portion 21. Herein, the mounting base 22 has at its outer periphery an annular concave groove 22a to fit a rotated shaft (not shown) of the lens grinding apparatus therein.

Note that the adhesive surface 21a of the lens holding portion 21 may be adsorbed to the curved surface 31 of the eyeglass lens 30 by any adsorbed means to secure the suction cup 20 to the eyeglass lens 30 with adsorption force of the adsorbed means.

To hold the eyeglass lens 30 between the lens rotated shafts by use of the suction cup 20, one adhesive surface of the double-stick tape 23 is first adhered to the adhesive surface 21a of the lens holding portion 21.

The other adhesive surface of the double-stick tape 23 on which the lens holding portion 21 is mounted is adhered to the curved surface 31 of the eyeglass lens 30 to secure the lens holding portion 21 to the eyeglass lens 30 with an adhesive force of the double-stick tape 23.

Next, the mounting base 22 of the suction cup 20 is inserted into a shaft mounting hole (not shown) provided in an end surface of one of the lens rotated shafts.

A rubber lens retainer (not shown) provided on the other lens rotated shaft is held on the eyeglass lens 30 to hold the eyeglass lens between the pair of lens rotated shafts.

On the other hand, to take out the eyeglass lens 30 from the lens rotated shafts after the eyeglass lens 30 is ground in a predetermined shape, the suction cup 20 is first disengaged from the shaft mounting hole of one lens rotated shaft with the suction cup 20 being adhered to the eyeglass lens 30 to take the eyeglass lens 30 and suction cup 20 out of the lens rotated shafts.

One adhesive surface of the double-stick tape 23 adhered to the adhesive surface 21a of the lens holding portion 21 is then removed from the curved surface 31 of the eyeglass lens 30 by pinching the mounting base 22 of the suction cup 20 by means of a pair of flat pinching portions of a conventional pliers.

However, in the conventional pliers used, pinching the mounting base by the flat pinching portions causes the mounting base 22 formed with a resilient member of rubber to deform to slip the pinching portions along the mounting base without gripping it. Since deformation of the mounting base 22 causes the mounting base to remove from the pinching portions, it is difficult to firmly grip the mounting base.

Since whole the flat pinching portions, also, contact with the mounting base, a contact area between the pinching portions and mounting base is large to disperse a pinching force. Accordingly, there is a defect that it is difficult to separate the lens holding portion from the eyeglass lens even though a strong force is applied on the mounting base 22.

SUMMARY OF THE INVENTION

It is an object of the present invention to provide pliers for suction cup capable of easily removing a suction cup from an eyeglass lens.

To accomplish the object as mentioned above, pliers according to the present invention are adapted to use to remove from an eyeglass lens a suction cup having a lens holding portion for holding the eyeglass lens and a mounting base formed integrally with the lens holding portion.

The pliers comprise first and second pinching portions relatively movable close and apart to each other for pinching the mounting base, opposed surfaces formed on the first and second pinching portions to oppose the mounting base and an engaged convex portion provided on at least one of the opposed surfaces of the first and second pinching portions to contact with the mounting base in one embodiment.

The engaged convex portion extends toward the opposed surface of the other pinching portion and is contactable with a portion of the mounting base.

In one example, a surface of the engaged convex portion contacting with the mounting base is flat.

In the other example, the surface contacting with the mounting base is arcuate.

In the other embodiment, an engaged convex portion is provided on each of the opposed surfaces of the first and second pinching portions.

The engaged convex portion provided on one opposed surface extends toward the other opposed surface. These engaged convex portions act to pinch a portion of the mounting base.

In one example, surfaces of the engaged convex portion contacting with the mounting base are flat.

In the other example, the surfaces contacting with the mounting base are arcuate.

The opposed surfaces of the first and second pinching portions are arcuate in one example.

BRIEF DESCRIPTION OF THE INVENTION

DETAILED DESCRIPTION OF PREFERRED EMBODIMENTS

Figure 1:
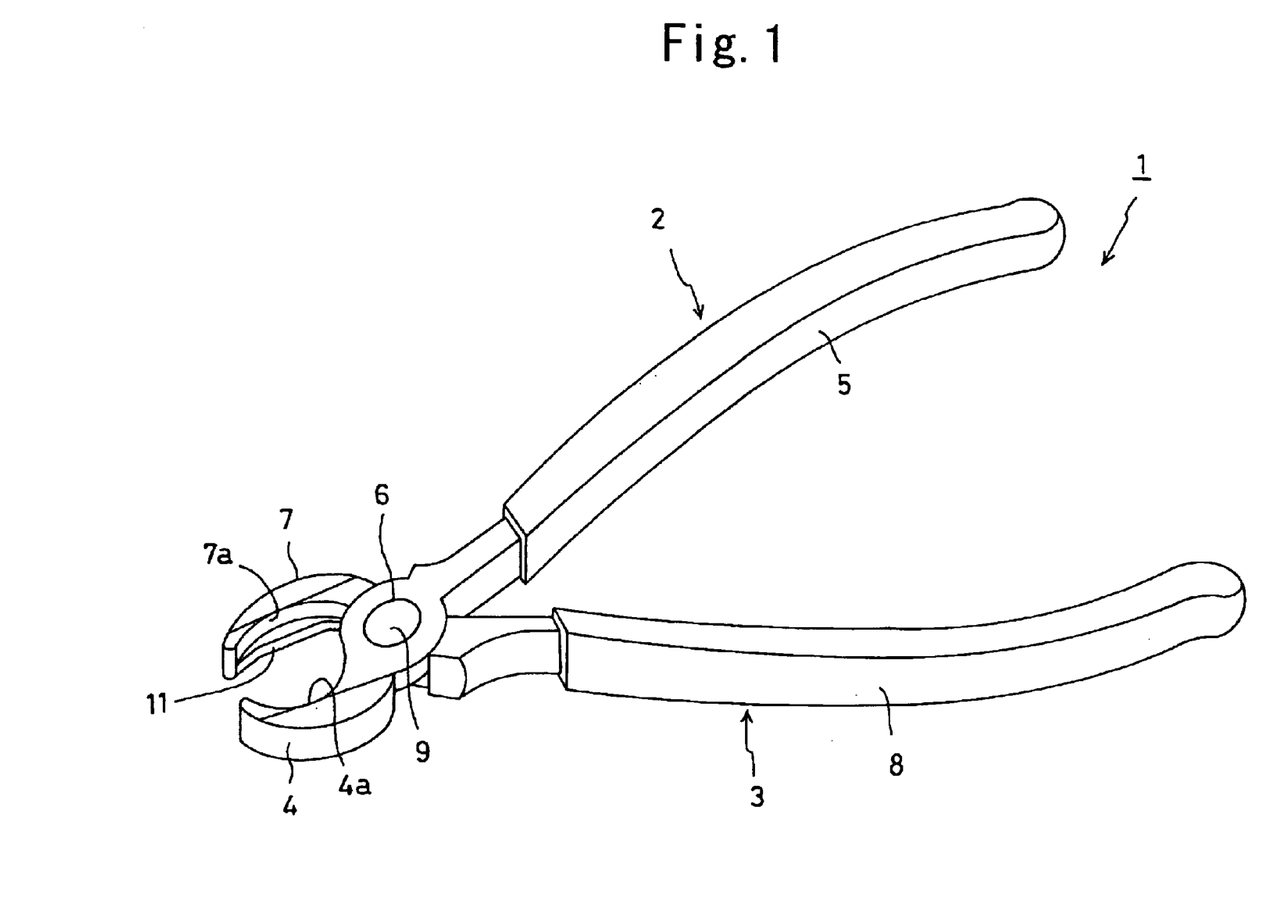
FIG. 1 is a perspective view showing as a whole pliers for suction cup according to the present invention.

Referring to FIG. 1, pliers 1 for suction cup according to the present invention are shown.

The pliers 1 comprise a first lever 2 and a second lever 3 in one embodiment.

The first lever has at one end a first pinching portion 4 and at the other end a gripping portion 5. The first lever 2 is provided with a shaft mounting hole 6 disposed adjacent the first pinching portion 4. The first lever 2 is curved in substantially S-shape at the center on the shaft mounting hole 6 as viewed from the top plan.

On the other hand, the second lever 3 has at one end a second pinching portion 7 and at the other end a second gripping portion 8.

The second lever 3 is formed integrally with a shaft portion 9 which is disposed adjacent the second pinching portion 7 and inserted rotatably into the shaft mounting hole 6 provided on the first lever 2. The second lever 3 is curved in substantially reversed S-shape at the center on the shaft portion 9 as viewed from the top plan.

As the first and second gripping portions 5 and 8 are operated to move close and apart relatively, the first and second levers 2 and 3 are connected to approach and separate relatively the first and second pinching portions 4 and 7 in accordance with the movement of the first and second gripping portions 5 and 8.

The first and second pinching portions 4 and 7 are formed to grip, for example, the mounting base 22 of the aforementioned suction cup 20 in this embodiment. These first and second pinching portions are formed from a metal of stainless and so on and have opposed surfaces to oppose the mounting base. The opposed surfaces of the pinching portions are bent to form first and second arcuate surfaces 4a and 7a in one example.

Figure 2:
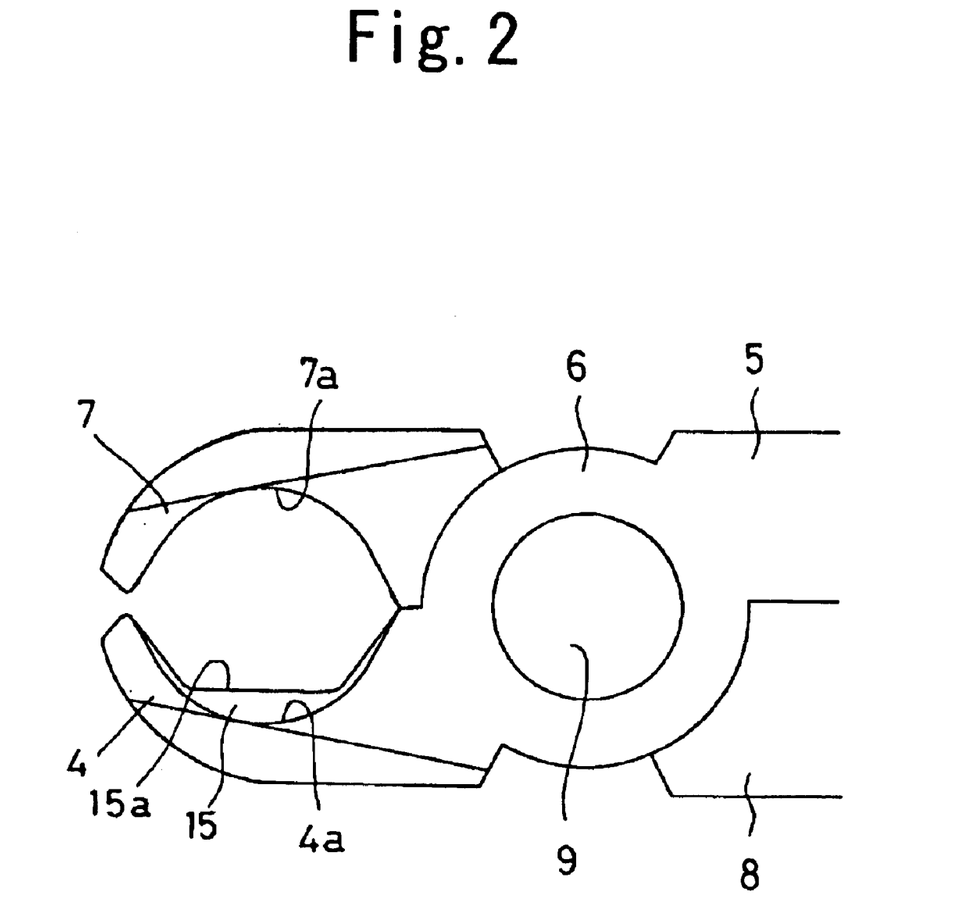
FIG. 2 is a plan view showing first and second pinching portions of pliers according to one embodiment of the present invention.

In one embodiment, at least one of the opposed surfaces of the pinching portions is provided with an engaged convex portion 16, as shown in FIG. 2.

Figure 3A:
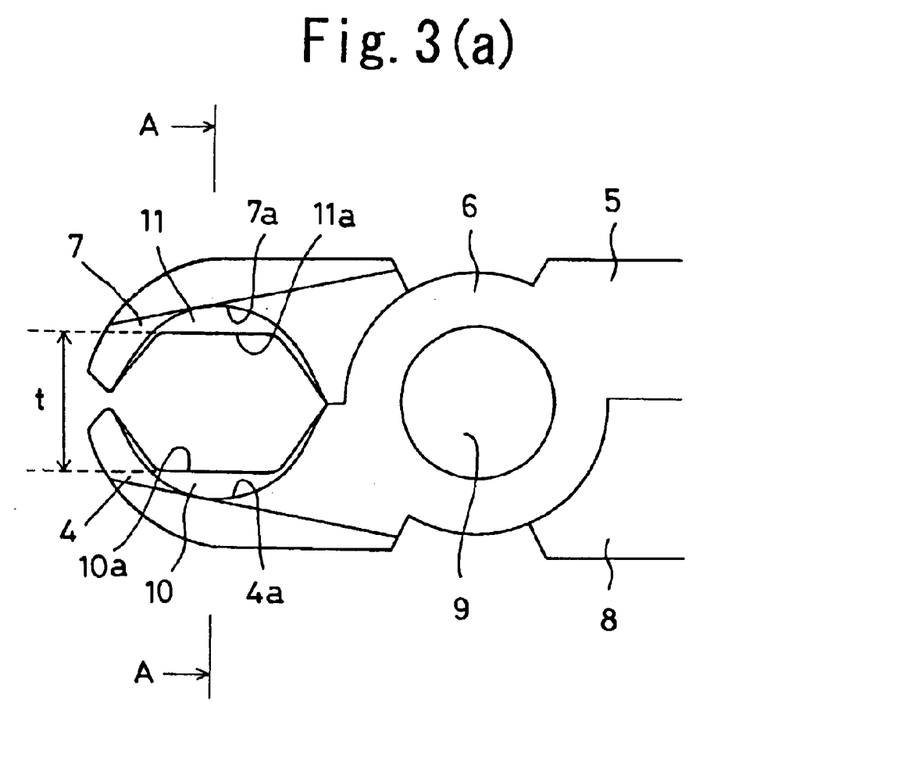
FIG. 3(a) is a plan view showing first and second pinching portions of pliers according to a second embodiment of the present invention.
Figure 3B:
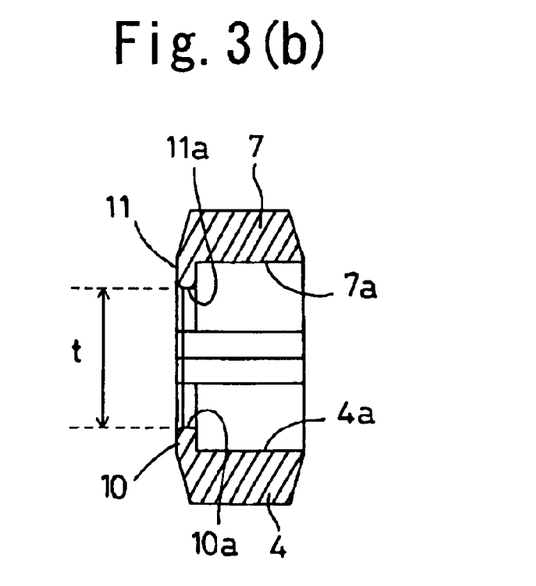
FIG. 3(b) is a sectional view taken along the line A—A in FIG. 3(a).

In the other embodiment, the first arcuate surface 4a is formed with a first engaged convex portion 10 and the second arcuate surface 7a is formed with a second engaged convex portion 11 as shown in FIG. 3(a).

For example, if one engaged convex portion 15 is provided on the first arcuate surface 4a, the engaged convex portion 15 extends toward the second arcuate surface 7a opposite to the convex portion 15 and pinches the mounting base 22 of the suction cup 20 between the engaged convex portion 15 and second arcuate surface 7a.

On the other hand, if the first and second engaged convex portions 10 and 11 are used, these first and second engaged convex portions pinch the mounting base 22.

Figure 5:
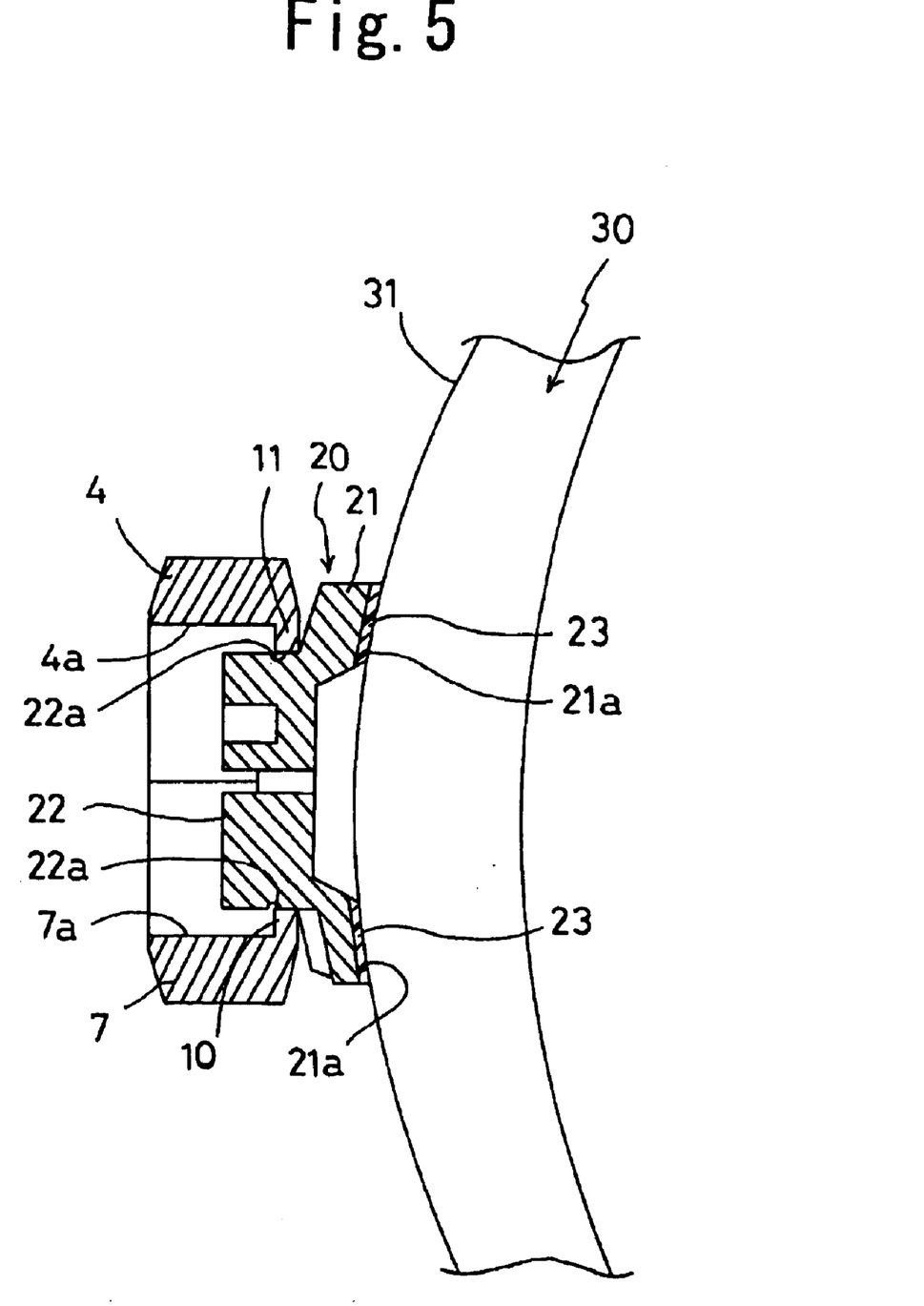
FIG. 5 is an enlarged sectional view showing a state of pinching a suction cup adhered to an eyeglass lens by the pliers according to the present invention.

It should be noted that the engaged convex portions 10 and 11 are set so that the engaged convex portion 10 extends toward the opposite second arcuate surface 7a and the engaged convex portion 11 extends toward the opposite first arcuate surface 4a and further the engaged convex portions 10 and 11 pinch a portion of the mounting base 22, for example, a root portion of the mounting base 22 as shown in FIG. 5.

Similarly, the engaged convex portion 15 formed on the first arcuate surface 7a extends toward the second arcuate surface 7a and is disposed to pinch the root portion of the mounting base 22 together with, for example, the second arcuate surface 7a.

Surfaces of the engaged convex portions 15, 10 and 11 contacting with the mounting base 22 are flat (straight) or arcuate.

In one embodiment, the engaged convex portion 15 has a thin plate-like configuration to contact with a portion of the mounting base 22. The first engaged convex portion 10 has a thin plate-like configuration which projects from the first arcuate surface 4a. The first engaged convex portion has a first straight portion 10a which contacts with the mounting base 22.

The second engaged convex portion 11 has a thin plate-like configuration which projects from the second arcuate surface 7a to oppose the first engaged convex portion 10. The engaged convex portion 15 has a straight portion 15a for contacting with the mounting base 22. The second engaged convex portion 11 has a second straight portion 11a which contacts with the mounting base 22 and is disposed to oppose the first straight portion 10a.

The leading portions of the first and second pinching portions 4 and 7 are curved to approach to each other (see FIG. 2 and FIG. 3(a)).

A distance t between first and second straight portions 10a and 11a is set to enable the mounting base 22 of the suction cup 20 to insert between the first and second straight portions in a state which they are most separated as shown in FIG. 3(a).

Figure 4:
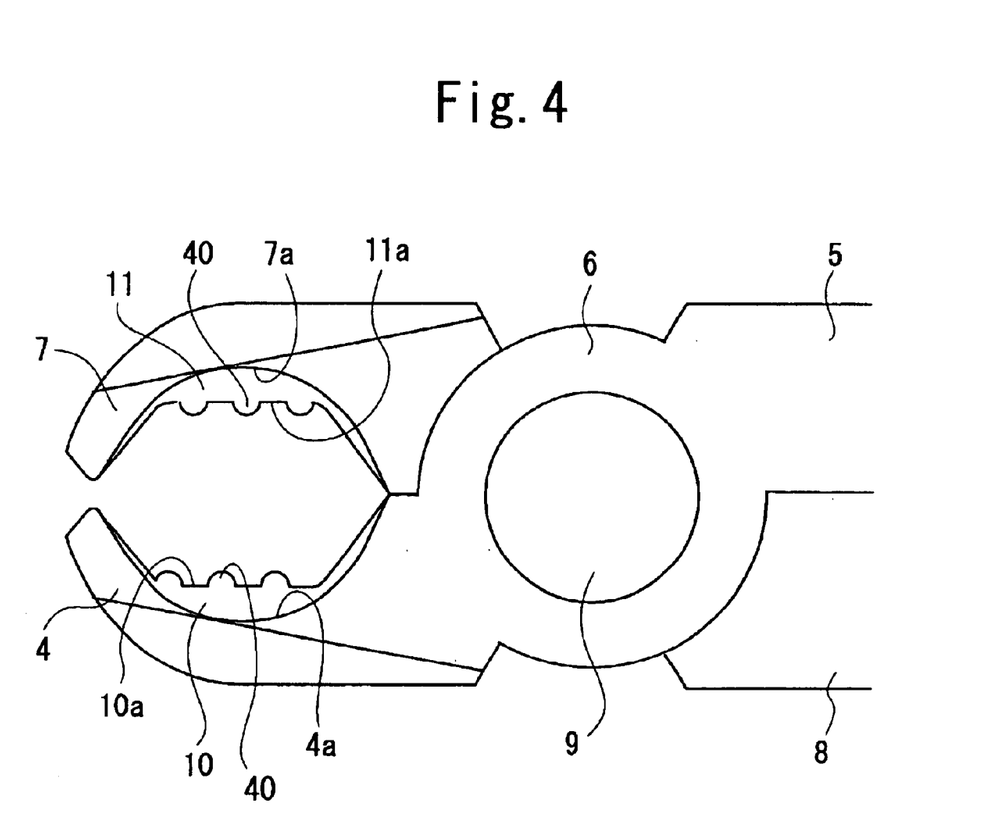
FIG. 4 is an enlarged plan view showing first and second pinching portions of pliers according to a third embodiment of the present invention.

A third embodiment of the present invention is shown in FIG. 4. In this embodiment, a plurality of spaced projections 40 are formed on each of the first and second straight portions 10a and 11a to contact with the mounting base 22. The projections are disposed in such a way that the projection provided on one of the straight portions 10a and 11 is inserted between the projections provided on the other of the straight portions. With such construction, it is possible to firmly hold the mounting base 22 without slipping between the engaged convex portions 10 and 11.

Only one portion, namely, a leading portion of the each of the engaged convex portions 15, 10 and 11 contacts with the mounting base 22. Since a thickness of each of the engaged convex portions 15, 10 and 11 is thin comparing with that of the first and second arcuate surfaces 4a and 7a, a contacting area of the engaged convex portions with the mounting base is more less than the first and second arcuate surfaces.

Accordingly, the engaged convex portions 15, 10 and 11 cause the mounting base to easily deform and bite into the mounting base to prevent a pinching force of the engaged convex portions from dispersing to firmly grip.

In this state, it is possible to easily remove the lens holding 15 portion 21 from the eyeglass lens 30. Further, the first and second pinching portions 4 and 7 are not disengaged easily from the mounting base 22 by inserting the leading portion of each of the engaged convex portions 15, 10 and 11 into an annular groove 22a formed on the mounting base 22.

The first and second gripping portions 5 and 8 are coated with covers as shown in FIG. 1.

An operation of the pliers as described above will be described as follows.

A user, first, removes the suction cup 20 equipped with the eyeglass lens 30 from the rotated shafts of the lens grinding apparatus (not shown).

Figure 6:
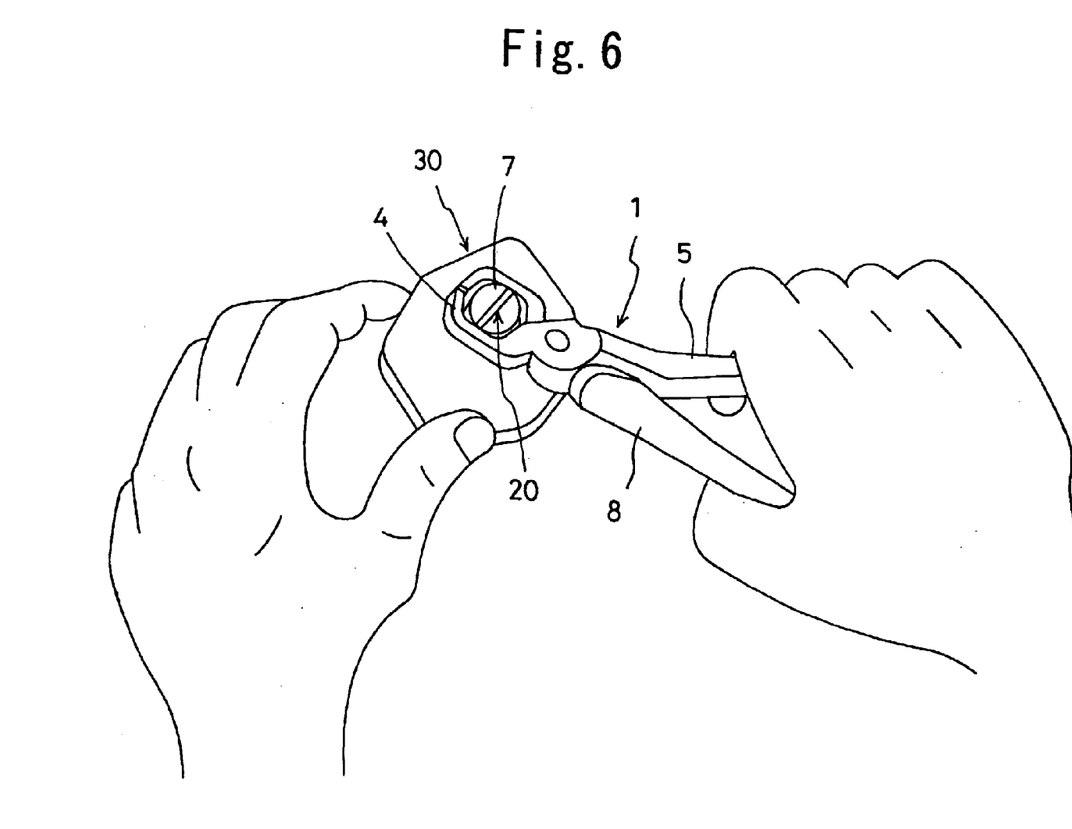
FIG. 6 is an explanatory perspective view showing a state of removing the suction cup adhered to the eyeglass lens.

Next, the first and second pinching portions 4 and 7 are spaced apart relatively by gripping the eyeglass lens 30 with one hand and by separating relatively the first and second gripping portions 5 and 8 of the pliers with the other hand (see FIG. 6).

The mounting base 22 of the suction cup 20 is inserted into a space between the spaced first and second pinching portions 4 and 7 to grip the mounting base 22 between the first and second pinching portions.

In this case, as shown in FIG. 5, it is preferable that the first and second engaged convex portions 10 and 11 grip the root portion of the mounting base 22 and end surfaces of the first and second pinching portions 4 and 7 adjacent the first and second engaged convex portions 10 and 11 abut with the lens holding portion 21.

When the first and second gripping portions 5 and 8 are gripped by the user so as to approach to each other, the first and second pinching portions 4 and 7 approach to press and grip the mounting base 22 by the first straight portion 10a of the first convex portion 10 and second straight portion 11a of the second engaged convex portion 11.

Note that the engaged convex portion 15 grips the mounting base 22 together with the second arcuate surface 7a as described above.

The mounting base 22 deforms with application of a pinching force by the first and second straight portions 10a and 11a, whereas the lens holding portion 21 does not deform since it is held between the end surfaces of the first and second pinching portions 4 and 7 and the eyeglass lens 30.

Consequently, only the mounting base 22 deforms between the first and second pinching portions 4 and 7 and thus the first and second engaged convex portions 10 and 11 (the engaged convex portion 15 and second arcuate surface 7a in the other embodiment) bite into the mounting base 22 to prevent the mounting base 22 from disengaging from the first and second pinching portions 4 and 7 so that the mounting base 22 is firmly held between the first and second pinching portions.

Because the straight portions 10a and 11a are formed on the first and second engaged convex portions, respectively, it is easy to closely contact the first and second engaged convex portions 10 and 11 with the mounting base 22.

On the condition of pinching the mounting base 22 by the first and second pinching portions 4 and 7, the user grips the pliers 1 and causes the pliers to rotate in parallel with the curved surface 31 to remove the adhesive surface 21a of the lens holding portion 21 from the curved surface 31 of the eyeglass lens 30.

In this case, because of the thin plate-like engaged convex portions 15, 10, 11 and straight portions 15a, 10a, 11a, the first and second pinching portions 4 and 7 can firmly hold the mounting base 22 to remove easily the adhesive surface 21a of the lens holding portion 21 from the curved surface 31 of the eyeglass lens 30 without occurring impact to the eyeglass lens 30, crack of the eyeglass lens, and damage of a coating on the eyeglass lens 30.

As described above, according to the present invention, it is easy to closely contact the deformed mounting base with the first and second pinching portions to firmly pinch without the mounting base being disengaged from the first and second pinching portions and therefore the lens holding portion of the suction cup can be removed from the eyeglass lens.

Furthermore, it is possible to prevent the pinching force of the first and second pinching portions against the mounting base from dispersing by contacting the thin plate-like portion(s) of the engaged convex portion(s) with the mounting portion. Consequently, the possibility that the mounting base is disengaged from the first and second pinching portions can still be eliminated to easily remove the lens holding portion from the eyeglass lens.

What is claimed is:

1. A combination of a suction cup attached to an eyeglass lens and pliers for the suction cup, adapted for removing the suction cup from the eyeglass lens, the suction cup comprising a lens holding portion for holding the eyeglass lens and a mounting base formed integrally with the lens holding portion, and the pliers comprising first and second pinching portions relatively movable toward and away from each other, for pinching said mounting base;

opposed surfaces formed on the first and second pinching portions to oppose the mounting base; and an engaged concave portion having a thin plate-like configuration provided on at least one of the opposed surfaces of the first and second pinching portions, said engaged concave portion extending toward the opposed surface of the other pinching portion and being contactable with a portion of the mounting base, said engaged concave portion having a straight portion, and said mounting base of said suction cup being pinched by said straight portion and the pinching portion opposing the straight portion.

2. The combination of a suction cup attached to an eyeglass lens and pliers for the suction cup according to claim 1, wherein a surface of the engaged concave portion contacting with the mounting base is flat.

3. The combination of a suction cup attached to an eyeglass lens and pliers for the suction cup according to claim 1, wherein a surface of the engaged concave portion contacting with the mounting base is arcuate.

4. A combination of a suction cup attached to an eyeglass lens and pliers for a the suction cup, adapted for removing the suction cup from the eyeglass lens, the suction cup comprising a lens holding portion for holding the eyeglass lens and a mounting base formed integrally with the lens holding portion, and the pliers comprising first and second pinching portions relatively movable toward and away from each other for pinching said mounting base;

opposed surfaces formed on the first and second pinching portions to oppose the mounting base; and an engaged concave portion having a thin plate-like configuration provided on each of the opposed surfaces of the first and second pinching portions said engaged concave portion extending toward the ether opposed surface of the other pinching portion and being contactable with a portion of the mounting base, said engaged concave portions having straight portions, and said mounting base of said suction cup being pinched by said straight portions.

5. The combination of a suction cup attached to an eyeglass lens and pliers for the suction cup according to claim 4, wherein surfaces of the engaged concave portions contacting with the mounting base are flat.

6. The combination of a suction cup attached to an eyeglass lens and pliers for the suction cup according to claim 4, wherein surfaces of the engaged concave portions contacting with the mounting base are arcuate.

7. The combination of a suction cup attached to an eyeglass lens and pliers for the suction cup according to claim 1, wherein the opposed surfaces of the first and second pinching portions are arcuate.

8. The combination of a suction cup attached to an eyeglass lens and pliers for the suction cup according to claim 4, wherein the opposed surfaces of the first and second pinching portions are arcuate.

9. The combination of a suction cup attached to an eyeglass lens and pliers for the suction cup according to claim 4, wherein surfaces of the engaged concave portions contacting with the mounting base are provided with a plurality of spaced projections to pinch the mounting base.

* * * * *